(12) United States Patent
Harrison

(10) Patent No.: US 6,538,636 B1
(45) Date of Patent: Mar. 25, 2003

(54) APPARATUS AND METHOD FOR CONFIGURING A HAND-HELD INTERACTIVE DEVICE

(75) Inventor: Edward R. Harrison, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/348,012

(22) Filed: Jul. 6, 1999

(51) Int. Cl.[7] ................................................. G09G 5/00
(52) U.S. Cl. ....................................... 345/156; 345/169
(58) Field of Search .............................. 345/156, 157, 345/163, 145, 165, 168, 166, 158, 169; 348/734

(56) References Cited

U.S. PATENT DOCUMENTS

| 5,402,152 | A | | 3/1995 | Needham | |
|---|---|---|---|---|---|
| 5,656,804 | A | * | 8/1997 | Barkan et al. | 235/472 |
| 5,731,801 | A | | 3/1998 | Fukuzaki | |
| 5,825,675 | A | * | 10/1998 | Want et al. | 708/142 |
| 5,841,425 | A | | 11/1998 | Zenz, Sr. | |
| 5,864,334 | A | * | 1/1999 | Sellers | 345/168 |
| 5,880,685 | A | * | 3/1999 | Weeks | 345/167 |
| 5,977,952 | A | * | 11/1999 | Francis | 345/163 |

* cited by examiner

*Primary Examiner*—Richard Hjerpe
*Assistant Examiner*—Ronald Laneau
(74) *Attorney, Agent, or Firm*—Pillsbury Winthrop LLP

(57) ABSTRACT

A hand-held interactive device having a display screen and control mechanisms for permitting a user to access information associated with a computer is provided. The device is capable of automatically determining an orientation of the device based upon a user's handedness preference or based upon the user's preference. In response to this determination, or in response to the user's selection, the device's appearance and behavior are reconfigured.

10 Claims, 10 Drawing Sheets

APPARATUS AND METHOD FOR CONFIGURING A HAND-HELD INTERACTIVE DEVICE

BACKGROUND OF THE INVENTION

1. Field of the Invention

The present invention relates to a hand-held interactive display. More particularly, the invention relates to a hand-held interactive computer related display device that can adapt its appearance and behavior based upon whether an individual is right-handed or left-handed or, in accordance with an individual's preference.

2. Description of the Related Art

Most devices are designed specifically for left or right-handed individuals. Due to the economics of device manufacture and design, the majority of these devices are manufactured for right-handed individuals. Only mass-market products, such as scissors, kitchen accessories (e.g. potato peelers), and sports equipment are commonly available in both left and right-handed versions. Only a few such computer-related devices are designed with consideration of the handedness of an individual or with the individual's personal preferences.

U.S. Pat. No. 5,731,801 presents a method for displaying an object on a display screen using an electronic pen, held in a user's dominant hand, and an electronic cursor in the user's other hand. The objects displayed on the screen are presented at the location of the user's non-dominant hand so that the electronic cursor does not interfere with the movement of the electronic pen when the pen is in use by the operator to input data to the screen. Here, the system asks if the user is left-handed or right-handed on the display screen, and then configures the screen to display information based upon this inquiry. This display screen reconfiguration permits the user to optimize simultaneous use of both the electronic pen and the cursor based upon the user's handedness.

U.S. Pat. No. 5,841,425 presents an ambidextrous computer mouse which uses at least one sensor to detect the presence of a human digit, such as a thumb or a finger. When the detection is made, the system automatically activates a software routine which configures the buttons on the mouse to accommodate a left-handed person or a right-handed person.

Finally, there is a known system for configuring an interface within a pen based system disclosed in U.S. Pat. No. 5,402,152. A user's handwriting style is entered into a computer and analyzed to determine left or right-handedness. The user's hand writing sample is matched to one of five different styles, each of which corresponds to a particular handedness. Scroll bars and the cursor of a display are configured based upon an analysis of the hand writing style. For a left-handed user, a horizontal scroll bar is placed on the bottom of the display window, a vertical scroll bar is placed on the left side of the display window, and a cursor points up and to the right. For a right-handed user, a vertical scroll bar is placed on the right of the display, a horizontal scroll bar is placed at the bottom of the display window, and a cursor points up and to the left.

SUMMARY

The invention provides a system capable of reconfiguring the appearance of a device display screen and at least one associated control mechanism, in response to a user's preferred display orientation. The preferred display orientation can be automatically determined based upon the physical orientation of the system. The system's appearance, including the display screen, control mechanism, logo, etc., is then reconfigured in accordance with the determined orientation.

According to the present invention, a hand-held interactive display device comprises at least one control mechanism for permitting a user to access information and a display screen for displaying the information when accessed by the user. An orientation of the device defines the position of the control mechanism and the display screen. At least one sensor is provided for sensing the orientation of the device and producing an output representative of the sensed orientation. Finally provided are means for configuring characteristics associated with the control mechanism and the display in accordance with the sensed orientation.

BRIEF DESCRIPTION OF THE DRAWINGS

The accompanying drawings, which are incorporated in and constitute a part of the specification, illustrate embodiments of the invention and, together with the general description given above and the detailed description of the embodiments given below, serve to explain the principles of the invention.

DETAILED DESCRIPTION

Figure 1:
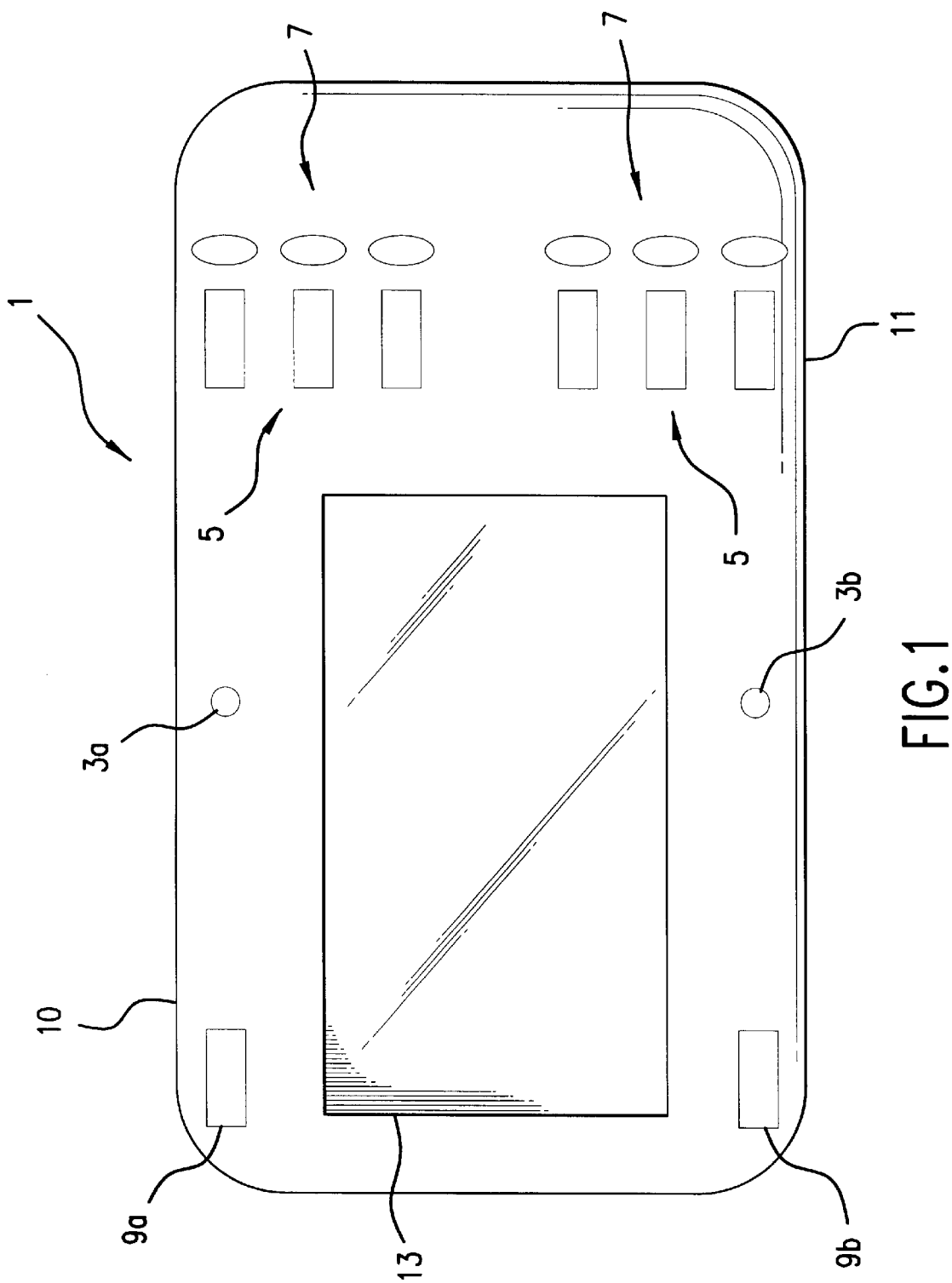
FIG. 1 is a diagram of an exemplary hand-held device capable of utilizing the invention.

With reference to FIG. 1, a hand-held interactive device 1 is shown for permitting a user to gain access to computer related information, such as the Internet. A display screen 13 of the device 1 is positioned near a number of control mechanisms 7. Legends 5 associated with the control mechanisms 7, appear in accordance with a user's preferred display orientation when the device 1 is activated. A logo, 9a or 9b, also appears in accordance with the preferred display orientation. The screen 13 permits the user to view the information accessed and can be, for example, of a liquid crystal nature. The control mechanisms 7 permit the user to control various aspects of an information access session, and include features such as scrolling the information presented, controlling screen features, such as brightness and contrast, or other related functions. The legends 5, representing features associated with each control mechanism, are positioned on the device, as illustrated in FIGS. 2 and 3.

When the device 1 is placed in use, sensors 3a and 3b sense the orientation of the device by determining whether or not the device 1 is oriented right-side up, or up-side down. When the sensor 3a senses that device side 10 is oriented upwardly, the device 1 is considered to be right-side up, illustrated in FIG. 2. When the sensor 3b senses that device side 11 is oriented upwardly, the device is considered to be up-side down, illustrated in FIG. 3.

Figure 2:
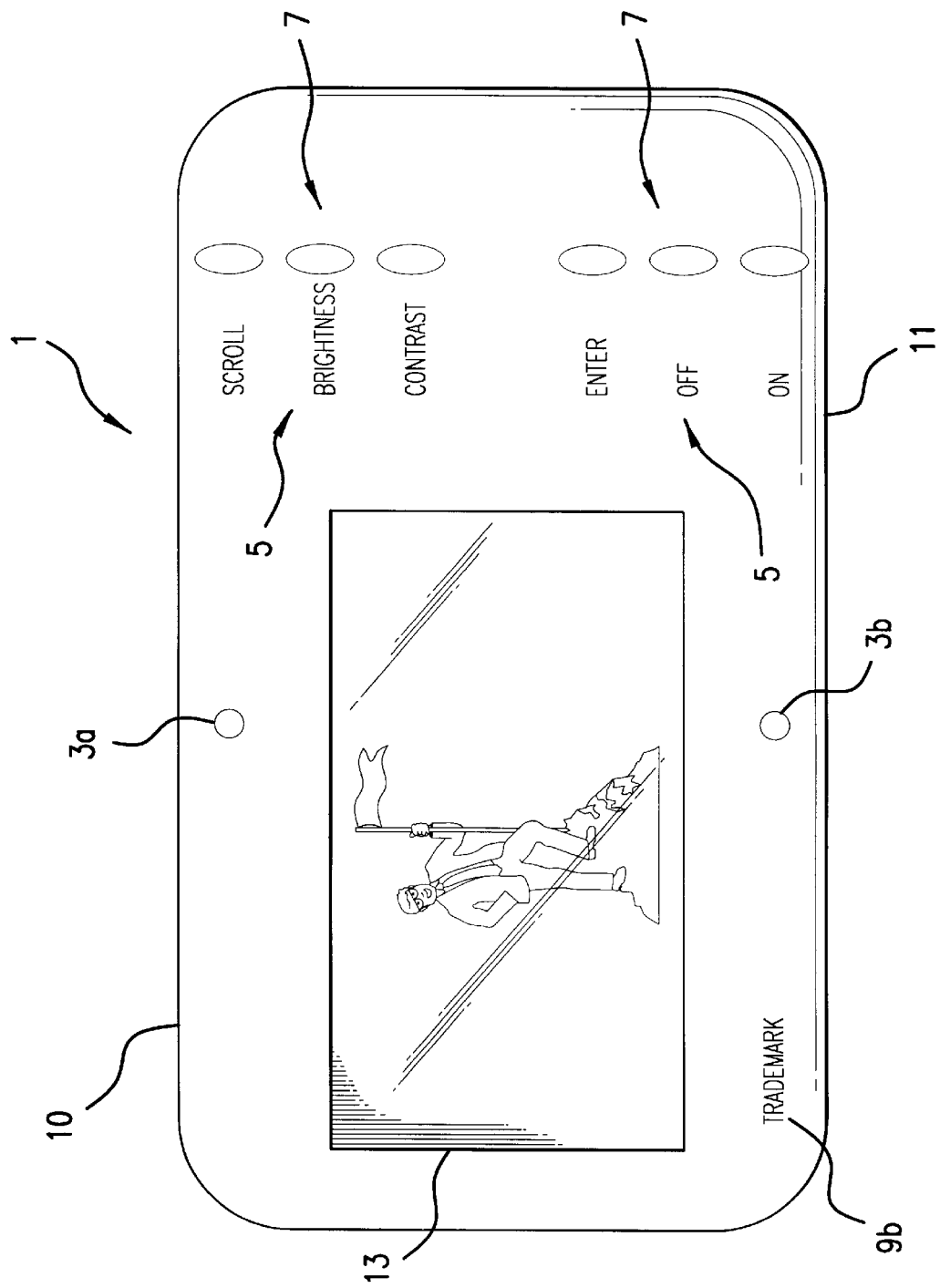
FIG. 2 is a diagram of the device of FIG. 1 configured for right-handed orientation.
Figure 3:
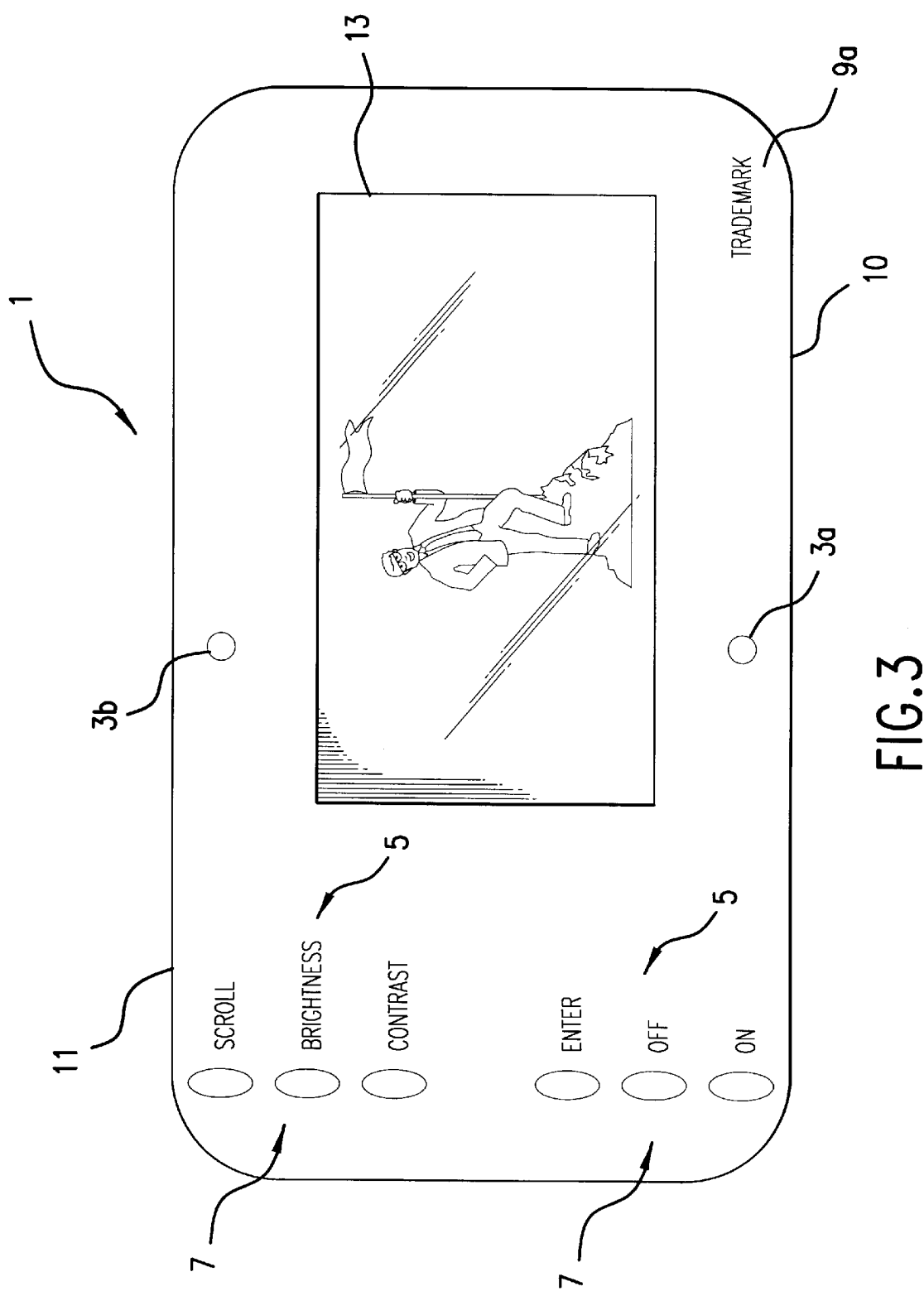
FIG. 3 is a diagram of the device of FIG. 1 configured for left-handed orientation.

When a user desires that the upper edge 10 be oriented in the upward direction, the device 1 is configured to present the appearance shown in FIG. 2. A user desiring this appearance may, for example, be right-handed. When configured in this manner, the features associated with the control mechanisms 7, and the legends 5 displaying these features, appear in accordance with a right-handed orientation of the device 1. Additionally, while logo 9b, for example, is visible to the user during a right-handed orientation, the logo 9a is not visible during this particular configuration. Light emitting plastic (LEP) or other advanced display techniques, make it possible to construct control mechanisms, buttons, logos, or other similar display components, in a manner where they are selectively visible to the user.

For the right-handed user, and as illustrated in FIG. 2, the positioning of the display screen 13 on a left side of the device 1 and the control mechanisms 7 on a right side, may be desirable. That is, a right-handed user may find it easier to use the device 1 when the control mechanisms 7 and legends 5, are located nearest his right hand. With the device 1 configured in accordance with FIG. 2, the user is prevented from obscuring his view of the display screen 13 by having to reach across the device 1 to use the control mechanisms 7 with his right hand, as would be required if the device 1 was configured as illustrated in FIG. 3.

Similarly, another user may desire to use device 1 in the configuration illustrated in FIG. 3. This user may, for example, be left-handed. For this user, the positioning of the display screen 13 on a right side of the device 1 and the control mechanisms 7 on the left side may be more desirable. With the device 1 configured in this manner, a left-handed user may find it easier to use the device 1 when the control mechanisms 7 and legends 5, are located nearest his left hand, as shown in FIG. 3.

When the device 1 is configured for left-handed orientation, the user is prevented from obscuring his view of the display screen 13 by having to reach across the device 1 to use the control mechanisms 7 with his left hand, as would be required if the device 1 was configured as illustrated in FIG. 2. To configure the appearance of the device 1, for left-handed orientation, the user need only orient the device 1 up-side down, with the edge 11 in the up direction. When turned upside down, the lower edge 11 faces the up direction, and the display screen 13, the control mechanisms 7, the legends 5, and the logo 9a, appear as illustrated in FIG. 3.

Figure 4:
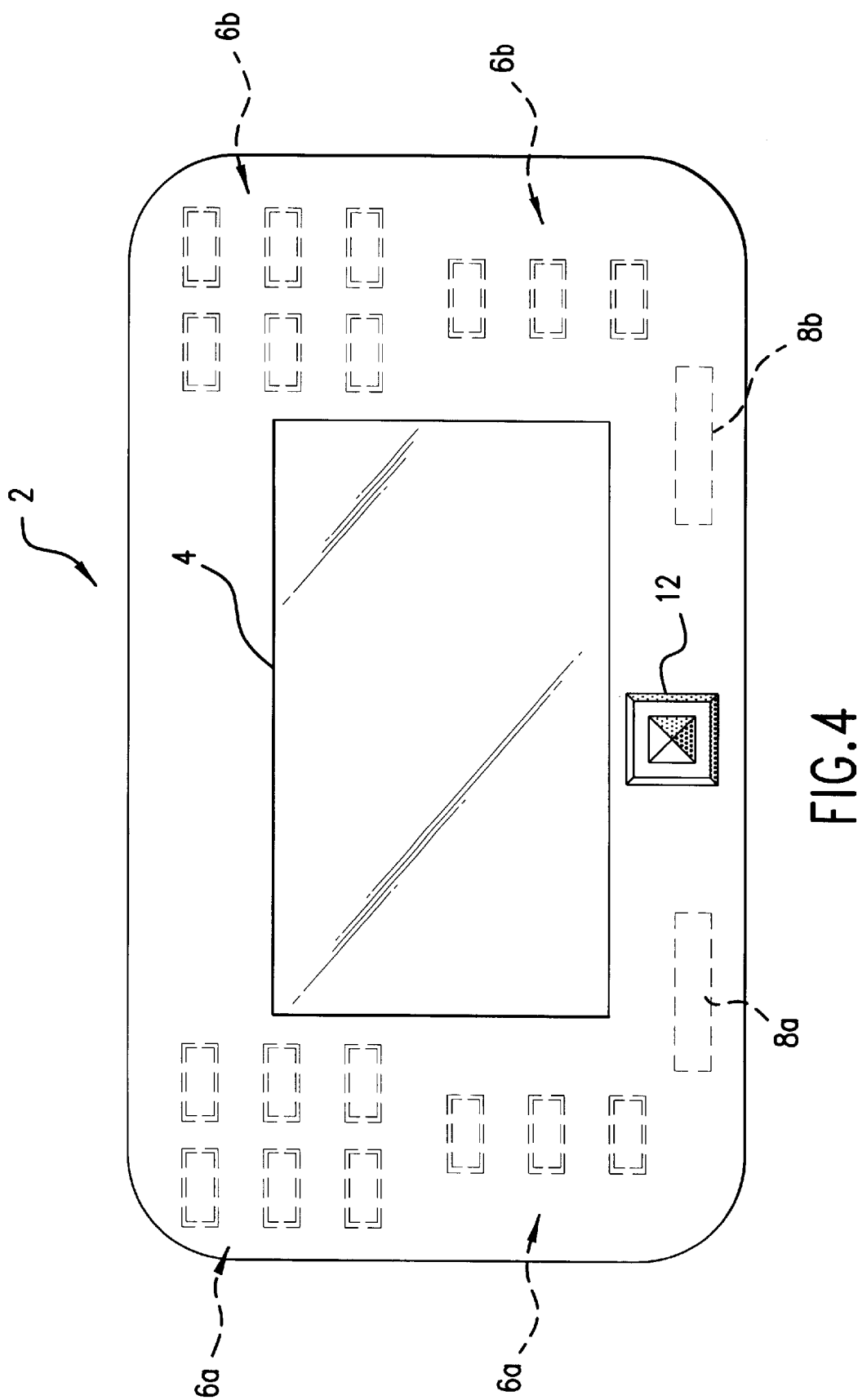
FIG. 4 is a diagram of another exemplary device capable of utilizing the invention.

FIG. 4 illustrates another exemplary device using the invention of the present application. Device 2 includes a display screen 4 positioned in a center location. Only one set of the control mechanisms 6a or 6b is visible and available for use by the user. The availability of a particular set, 6a or 6b, is dependent upon the particular display configuration selected by the user. The control mechanism of set 6a or 6b not selected, i.e., whichever set is not needed to support the display configuration, will not be visible to the user.

Figure 5:
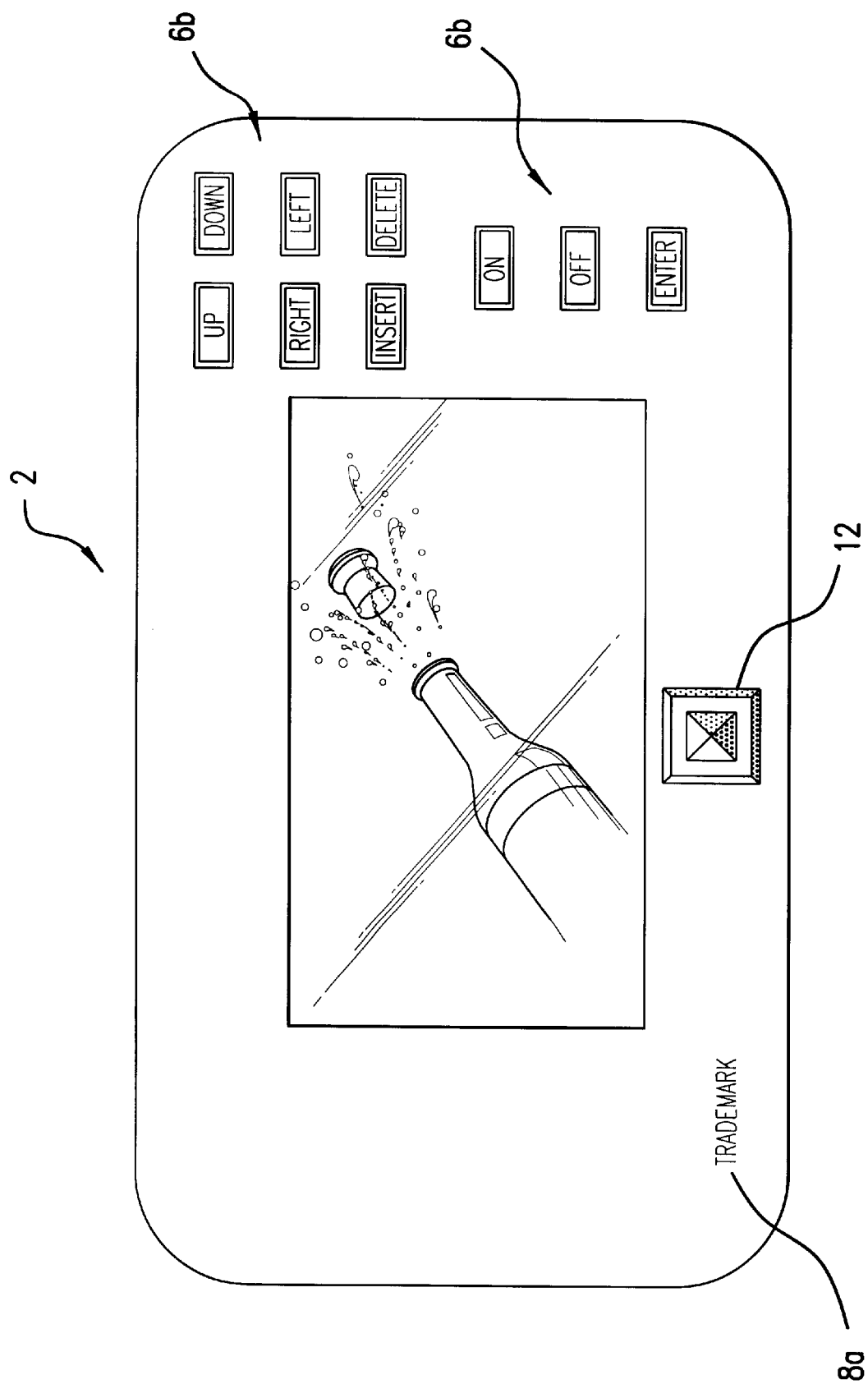
FIG. 5 is a diagram of the device of FIG. 4 configured for right-handed orientation.
Figure 6:
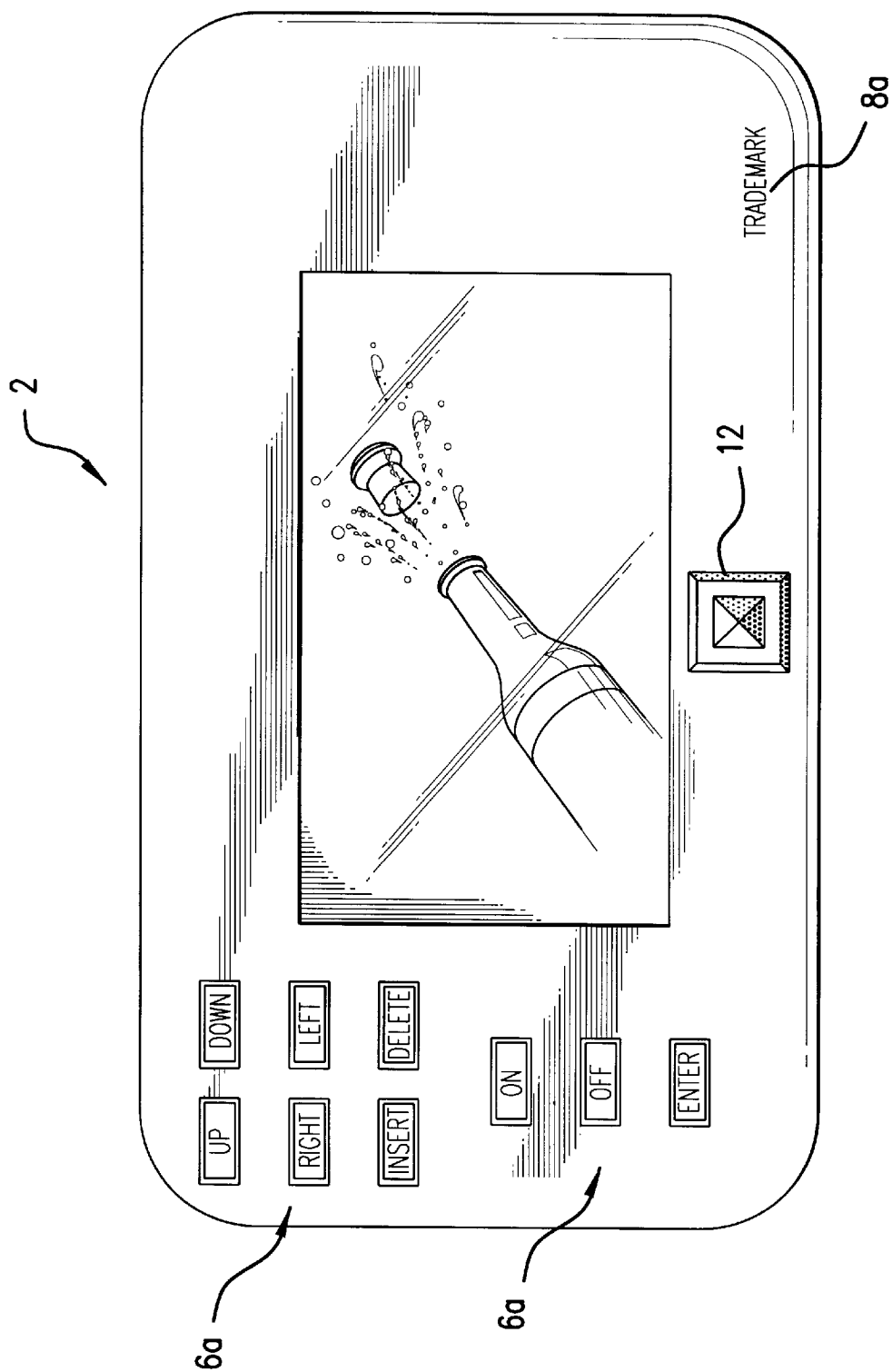
FIG. 6 is a diagram of the device of FIG. 4 configured for left-handed orientation.

Similarly, only one of the logos 8a or 8b, will be visible to the user, depending on the display configuration selected. A switch 12 permits the user to select between a number of desirable display configurations. For example, the illustrations of FIGS. 5 and 6 show that the appearance of the device 2 may be changed by the user to accommodate the user's handedness. However, the advanced display techniques discussed above permit construction of the device 2 in a manner such that it may be adapted to accommodate many other desirable configurations, such as a portrait mode, or landscape mode. In each of these configurations, the control mechanisms 6a and 6b, the logos 8a and 8b, or other similar display components, can be moved around the device 2 to accommodate the user's display preference.

FIG. 5 illustrates the appearance of device 2 configured in accordance with a right-handedness preference. As such, after the user selects the desired display preference using the switch 12, only control mechanisms 6b, and logo 8a, are made visible. Similarly, FIG. 6 illustrates the appearance of device 2 configured in accordance with a left-handedness preference. Here, only control mechanisms 6a, and logos 8b, are made visible to the user. Next, the process of determining and selecting a display configuration will be discussed in detail.

In the exemplary device 1 illustrated in FIGS. 1–3, the sensors 3a, and 3b periodically sense the orientation of the device 1 and accordingly will reflect any new orientation. Each of the sensors 3a and 3b is respectively associated with one of the edges, 10 and 11. When the device 1 is turned upside down, the sensor 3b senses that the lower edge 11 is oriented toward the up direction and the display screen 13, the control mechanisms 7, the legends 5, and the logos 9, of device 1, are configured to appear as shown in FIG. 3. The technology for the sensors is well known in the art and can include, for example, accelerometers, or mercury switches.

Figure 7:
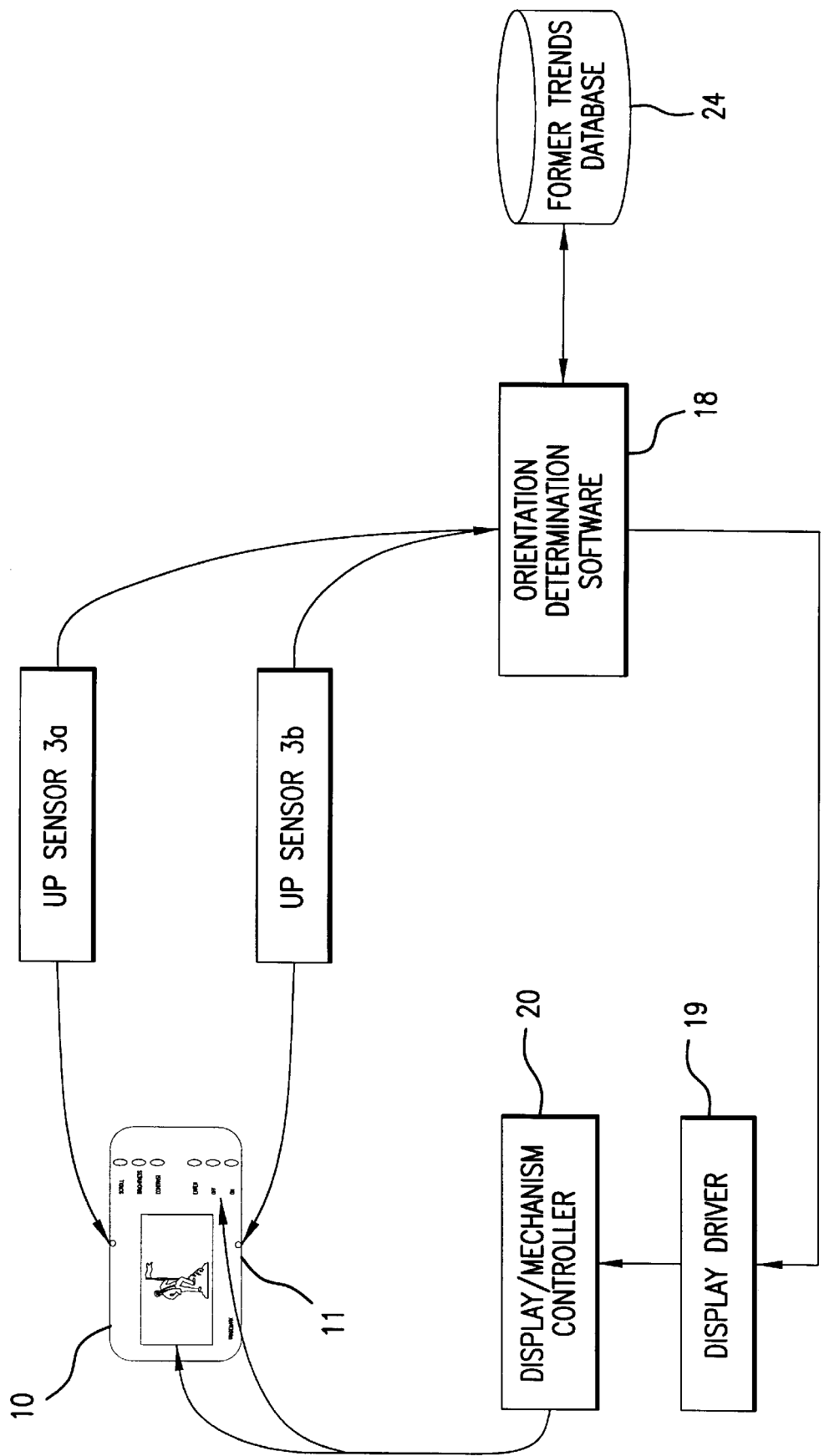
FIG. 7 is an illustration of the device of FIG. 1 configured for right-handed orientation and displaying the major modules used in the orientation determination process.

As shown in FIG. 7, the sensors, 3a and 3b, sense which edge, upper edge 10, or lower edge 11, of the device 1, is oriented in the up direction. Upon completion of the sensors, 3a and 3b, sensing the orientation, orientation determination software 18 determines the proper configuration of the device 1 and directs a display driver 19 and display screen/mechanism controller 20 to appropriately configure the display screen 13, control mechanisms 7, legends 5, and logos 9, based upon the sensing of the sensors 3a and 3b. Upon each movement of the device 1, information supplied by the sensors, 3a and 3b, regarding the orientation of the device 1, is stored in a former trends database 24.

Figure 8:
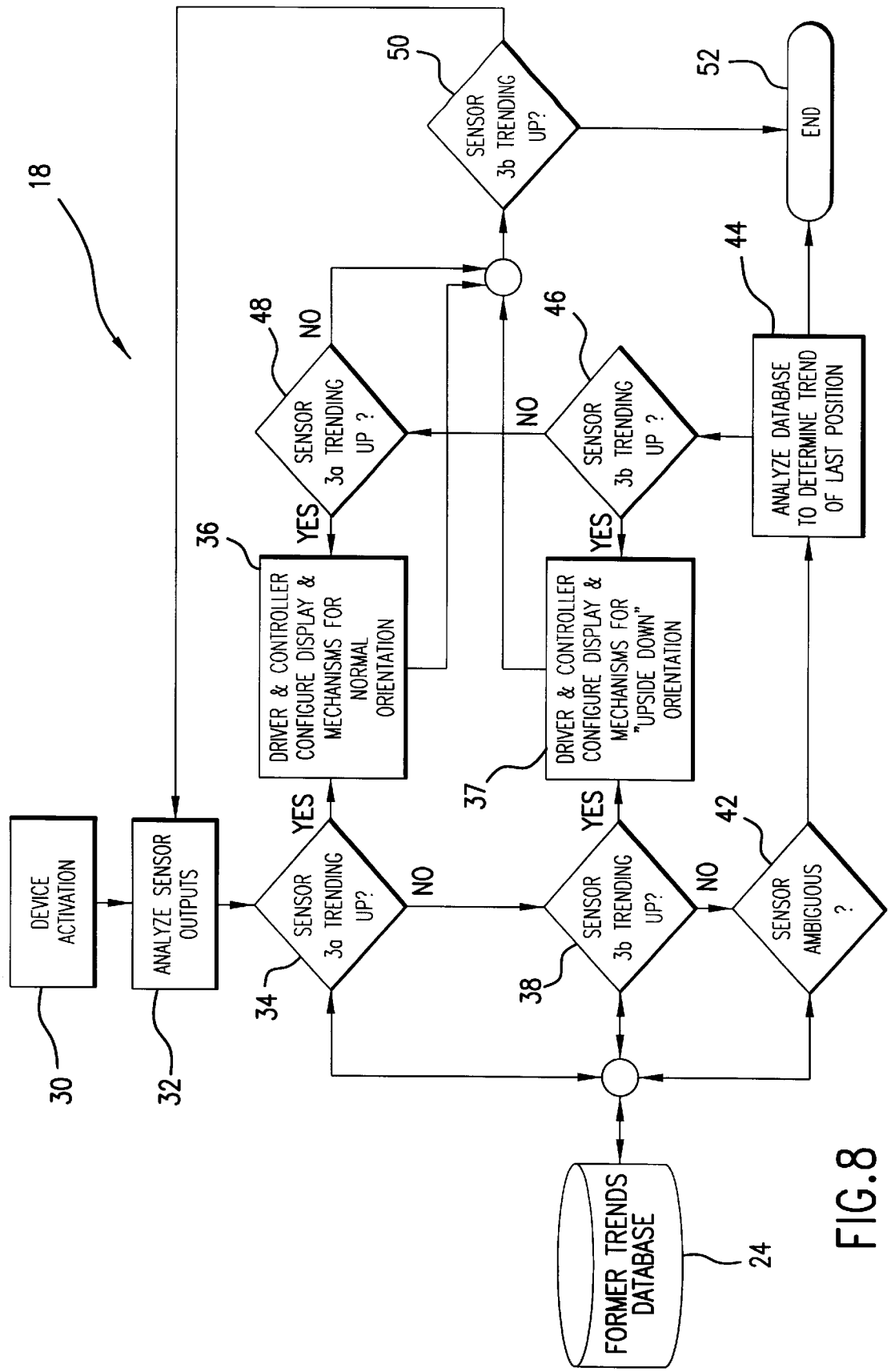
FIG. 8 is a flow chart of the process for determining a user's preferred orientation.

When the sensors, 3a and 3b sense the orientation of the device 1, the orientation determination software 18 determines the proper configuration of the display screen 13, control mechanisms 7, legends 5, and logos 9, based on a right or left-handed orientation preference of the user. In FIG. 8, when the user initiates device activation 30, outputs of each of the sensors, 3a and 3b, are analyzed 32. First, an analysis of sensor 3a is made to determine if the outputs produced by sensor 3a trend toward an up orientation 34. If sensor 3a is determined to be trending upwardly, the display driver 19 and display/mechanism controller 20 configure 36 the display screen 13, control mechanisms 7, legends 5, and logos 9, for a normal orientation as shown in FIG. 2. That is, device 1 is configured so that the display screen 13 is positioned to the left side of the control mechanisms 7, and legends 5.

If sensor 3a does not indicate that it trends toward an up orientation, outputs produced by sensor 3b are analyzed to determine if sensor 3b trends toward an up orientation 38. If the sensor 3b trends upwardly, the display driver 19 and the display/mechanism controller 20 configure 37 the display screen 13, control mechanisms 7, legends 5, and logos 9 as shown in FIG. 3. That is, the device 1 is configured for an upside down orientation where the lower edge 11 is oriented upwardly. During the analysis of the outputs, 3a and 3b, the orientation determination software extracts trend information from the former trends database 24 regarding previous orientations of the sensors 3a and 3b. Additionally, the database 24 is updated with new information to create a history of recent sensor trends each time the sensor outputs are analyzed.

Figure 9:
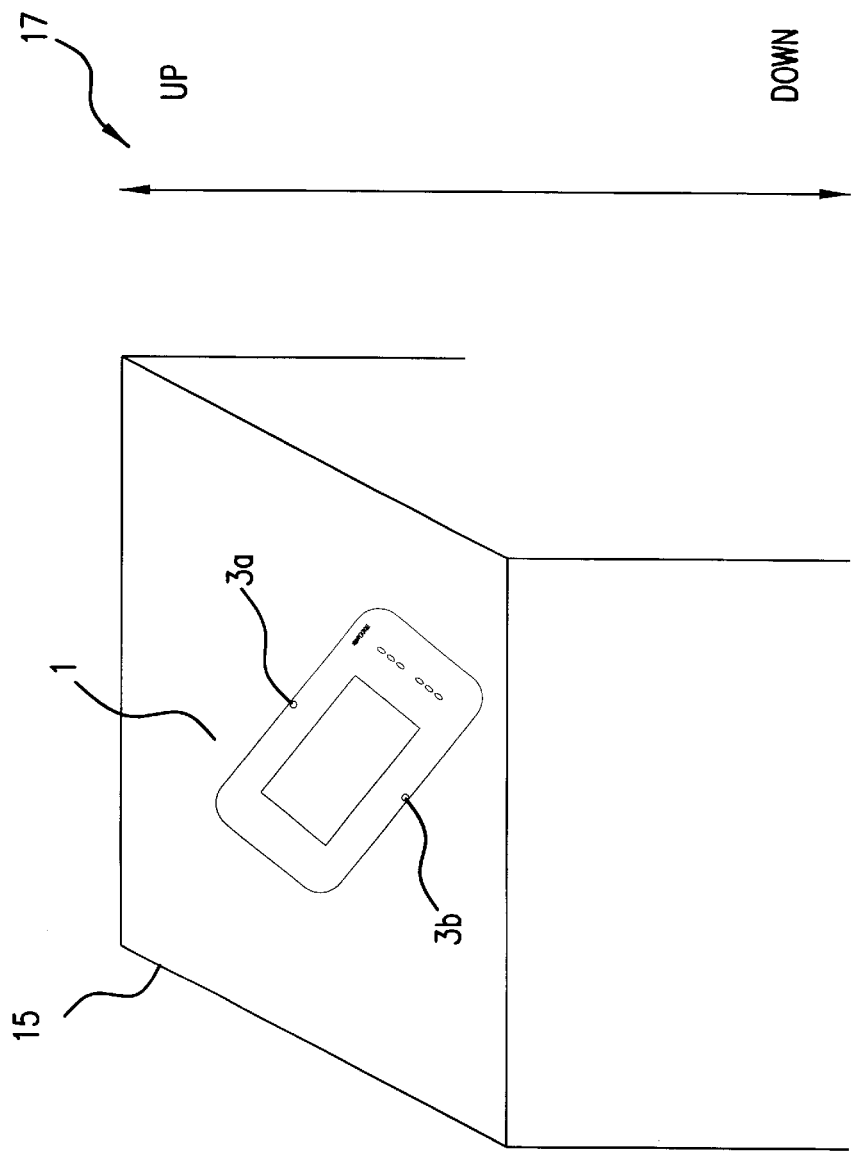
FIG. 9 is a diagram of the device of FIG. 1 under conditions presenting an ambiguous orientation determination.

On certain occasions, however, the position of the device 1 may not lend itself to a clear and distinct up determination based upon the sensors 3a and 3b. Such an occasion will occur in FIG. 9. Here, when a user activates the device 1 and, for example, places it on a table surface 15, it becomes unclear as to which of the sensors, 3a or 3b, is oriented in the up direction 17. In this case, the sensors 3a and 3b may produce ambiguous results 42. When this occurs, the orientation determination software 18 analyzes entries made 44 in the former trends database 24 to determine recent and previous trends of each of the sensors, 3a and 3b, in an attempt to resolve the ambiguity 42. After analysis of information from the former trends database 24, the orientation determination software 18 determines if there is a sufficient basis to suspect that sensor 3b is trending toward an up orientation 46, based upon the previous history of sensor 3b. If so, the display driver 19 and display/mechanism controller 20 configure 37 the display screen 13, control mechanisms 7, legends 5, and logos 9, for an upside down orientation as described above. If the analysis of 3b trends 46 is inconclusive, the analysis 44 of the former trends database 24 attempts to determine if there is a sufficient basis to suspect that sensor 3a is trending toward an up orientation 48, based upon the previous history of sensor 3a. If so, the display/mechanism controller 20 configures 36 the display screen 13, control mechanisms 7, legends 5, and logos 9 for a normal display as described above.

After configuration of the display screen 13, control mechanisms 7, legends 5, and logos 9 by the display driver 19 and display/mechanism controller 20, the orientation determination software 18 monitors device 1 to determine if an input has been entered by the user to terminate use 50 of the device 1. If no such input has been made by the user, the orientation determination software 18 repeats the process by analyzing the outputs of each of the sensors 3a and 3b. This process continues until the user decides to terminate use 50 of the device 1 by ending the session 52.

The device 1, of the present invention, affords a user the advantage of operating a hand-held interactive device that automatically adapts itself to the user's preferred display orientation. In response to determining the proper display orientation, the device's appearance and behavior are altered to accommodate the determined orientation. Other devices embodying the invention of the present application, may be configured in accordance with a user's preferences or style as opposed to only handedness related orientations.

Figure 10:
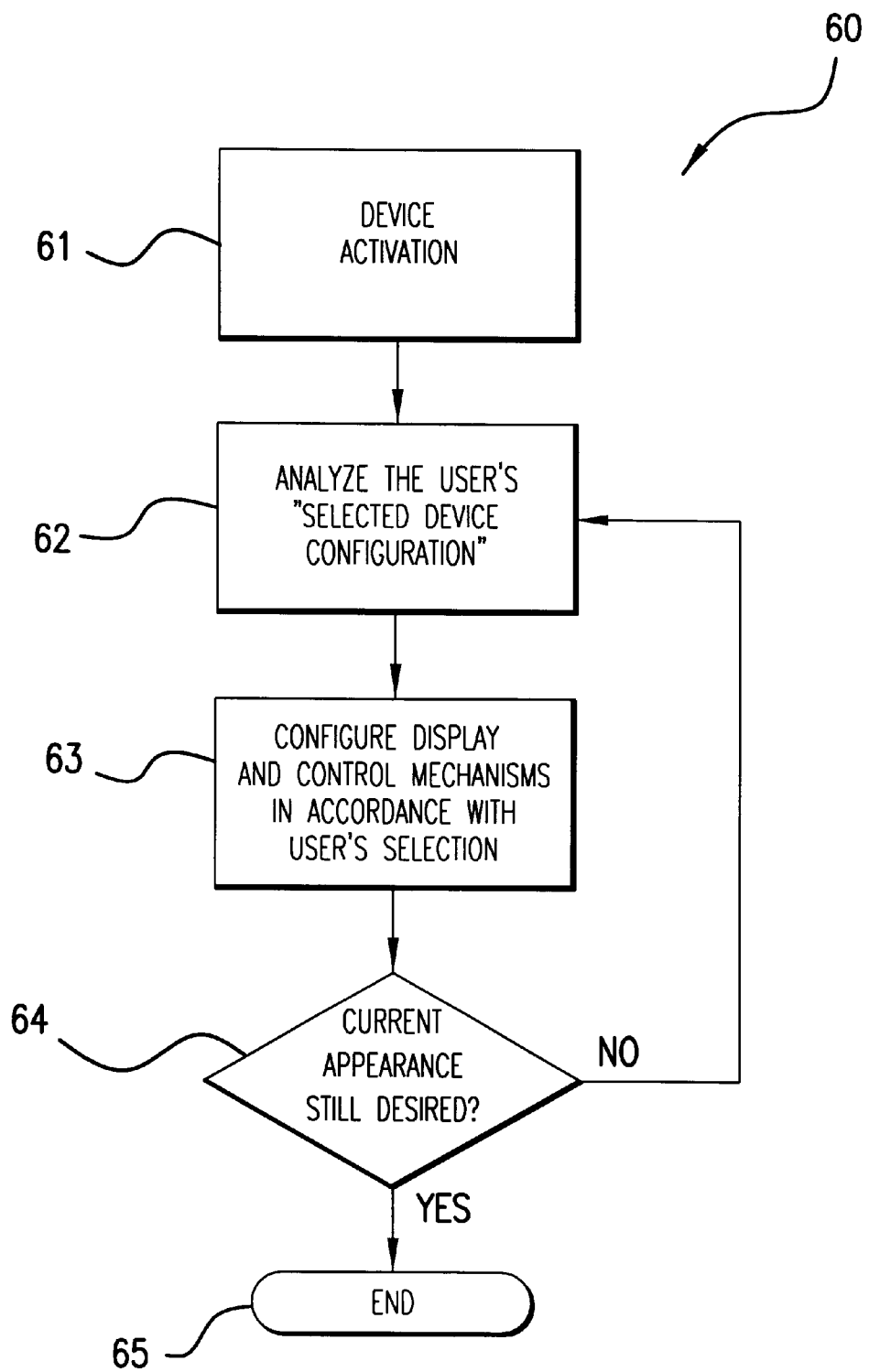
FIG. 10 is a flow chart of the process used to configure the device of FIG. 4 in accordance with a user's selected preference.

In device 2 of FIG. 4 for example, the user merely selects the display preference from a number of available display configurations, as shown in the process 60 of FIG. 10. The user first activates device 2 at step 61. An input device, such as the switch 12 of FIGS. 3–6, permits the user to select a preferred appearance, as shown at step 62. Next, a controller configures 63 the display screen 4, control mechanisms 6a and 6b, and logos 8a and 8b, in accordance with the user's selection. A polling routine 64 monitors the input, switch 12, of device 2 to determine if a different display configuration has been selected. If the user desires the device 2 to appear differently, the user enters an alternative selection at step 62. On the other hand, if the user desires to terminate use of the device 2, the process may be terminated at step 65.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A hand-held interactive device, comprising:
   at least one control mechanism permitting a user to access information;
   a display screen to display the information;
   at least one sensor to detect a right-hand orientation and a left-hand orientation of the interactive device, the at least one sensor producing an output in response to one of the right-hand orientation and the left-hand orientation detected; and
   an orientation determination module to receive the output from the at least one sensor to automatically configure the display screen to display the information on the display screen corresponding to one of the right-hand orientation and the left-hand orientation detected, and to automatically configure the at least one control mechanism to be operable in one of the right-hand orientation and the left-hand orientation detected.

2. A hand-held interactive device according to claim 1, wherein the display screen is a liquid crystal display.

3. A hand-held interactive device according to claim 1, wherein the at least one control mechanism includes buttons and scroll devices.

4. A hand-held interactive device according to claim 1, wherein the at least one control mechanism includes light emitting diodes.

5. A hand-held interactive device according to claim 1, wherein the at least one control mechanism includes liquid crystal devices.

6. A hand-held interactive device according to claim 1, wherein the at least one control mechanism includes light emitting plastic displays.

7. A hand-held interactive device according to claim 6 wherein only the light emitting plastic displays corresponding to one of the right-hand orientation and the left-hand orientation detected are visible.

8. A hand-held interactive device according to claim 1, wherein the at least one sensor includes a mercury switch.

9. A hand-held interactive device according to claim 1, wherein the at least one sensor includes an accelerometer.

10. A method of configuring a hand-held interactive device, comprising:
    detecting a right-hand orientation and a left-hand orientation of the interactive device;
    configuring automatically a display screen to display information on the display screen corresponding to one of the right-hand orientation and the left-hand orientation detected; and
    configuring automatically at least one control mechanism to be operable in one of the right-hand orientation and the left-hand orientation detected.

* * * * *